United States Patent [19]

Hill

[11] Patent Number: 4,842,871

[45] Date of Patent: Jun. 27, 1989

[54] METHOD AND INOCULANT FOR PRESERVING AGRICULTURAL PRODUCTS FOR ANIMAL FEED

[75] Inventor: John E. Hill, Des Moines, Iowa

[73] Assignee: Pioneer Hi-Bred International, Inc., Johnston, Iowa

[21] Appl. No.: 761,557

[22] Filed: Aug. 1, 1985

[51] Int. Cl.$^4$ .......................... A23B 9/00; A23B 7/10; A23B 4/12; C12N 1/20

[52] U.S. Cl. ........................................ 426/44; 426/46; 426/52; 426/53; 426/56; 426/335; 426/532; 435/42; 435/139; 435/252.9; 435/857

[58] Field of Search ................. 435/139, 253, 857, 42; 426/43, 46, 53, 52, 56, 59, 44, 335, 532

[56] References Cited

U.S. PATENT DOCUMENTS 4,264,448 4/1981 Bodenrader ........................... 426/43
4,528,199 7/1985 Moon et al. ........................... 435/857

Primary Examiner—Elizabeth C. Weimar
Attorney, Agent, or Firm—Saidman, Sterne, Kessler & Goldstein

[57] ABSTRACT

The invention relates to a method of preserving agricultural products comprising treating these products with an effective amount of *Lactobacillus plantarum* ATCC 53187 or mutants thereof and the treating organism.

17 Claims, No Drawings

METHOD AND INOCULANT FOR PRESERVING AGRICULTURAL PRODUCTS FOR ANIMAL FEED

BACKGROUND OF THE INVENTION

1. Field of the Invention

The invention relates to a method for preserving agricultural products which are used for animal feed and a *Lactobacillus plantarum* inoculant for use in the method.

2. Brief Description of the Background Art

Spoilage of stored agricultural products is a major problem in the farming industry. This spoilage often arises during long-term storage of these agricultural materials. Typically, long-term storage is necessary to provide adequate supplies of feed for domestic animals during those times of the year when fresh feeds are unavailable.

The storage of silage, baled hay, and storage of high moisture grain are among the most common approaches for providing an adequate supply of feed for those months when fresh feeds are unavailable.

Silage is produced by the anaerobic fermentation of the materials described above. Typically, the material is vegetable matter which is cut and then loaded into a silo, most commonly a vertical cylindrical structure, and kept anaerobic to inhibit the growth of aerobic spoilage organisms. Ideally, under anaerobic conditions the homofermentative bacteria proliferate, producing lactic acid which, by lowering the pH of the environment, further inhibits the growth of undesirable organisms. Unfortunately, the contents of the silo often become exposed to air due to leaks in the silo structure or during the gradual removal of silage. Such re-exposure to aerobic conditions allows proliferation of fungi to occur and results in spoilage of the silage.

In most circumstances, hay is cut and allowed to dry in the field until the moisture level has dropped to 8-15%. This drying process is performed because hay baled at higher levels of moisture is much more likely to degenerate due to the influence of heat of decomposition and the activity of epiphytic spoilage organisms. Unfortunately, while drying the hay to 8–15% moisture substantially avoids these detrimental effects, these low levels of moisture result in high field losses due to drying and hay of diminished nutritional value due to loss of the leafy part of the plant. It is, therefore, most desirable to bail hay at moisture levels of 25-30% if deterioration due to heat and microorganisms can be controlled.

The high moisture grain is stored in silos under anaerobic conditions, as described above for silage. Spoilage of high-moisture corn is due primarily to fungi which proliferate under storage conditions. *Candida guilliermondii, Candida pelliculosa, Hansemula anomala, Penicillium spp.*, and *Aspergillus spp.* are among those fungi often responsible for the spoilage of high-moisture grains and silage.

Often the materials which are preserved using these processes contain naturally-occurring opportunistic epiphytes. These epiphytes may be beneficial or detrimental in determining the eventual status of the preserved agricultural material and compete among themselves for ecological dominance in the stored material.

The predominance of undesirable organisms can result in spoilage and contamination of the feed material such that it can no longer be used to maintain domestic animals. These undesirable organisms may exert their effect by destroying the nutritive value of the feed, or even by producing toxins which are dangerous to the well-being of the animals. A common source of spoilage organisms is found in storage facilities and on associated processing equipment. These spoilage organisms may be either bacteria or fungi. Common bacterial spoilage organisms are those which are members of the genera Clostridium and Listeria. Fungal spoilage is often caused by members of the genera Aspergillus, Candida, Mucor, and Saccharomyces.

Various approaches have been made to limit the proliferation of those epiphytes and storage organisms responsible for spoilage of agricultural products. Since the desirable epiphytes are tolerant of low pH, while spoilage organisms such as Clostridium spp. are not, one simple approach has been to spray the agricultural material at the time of storage with an acid as, for example, propionic acid. A major disadvantage of this approach is its cost since large quantities of acid must be used to adequately treat the agricultural material. In addition, the inherently toxic and corrosive nature of propionic acid requires that special handling techniques be used by the farmer to protect personnel handling the acid. Further, all equipment coming in contact with the acid must be thoroughly decontaminated to avoid corrosive damage.

Another approach to limiting the growth of undesirable organisms during the storage of agricultural materials has been to inoculate these materials with those epiphytes thought to be beneficial to the preservation of the agricultural material such that the epiphytes will be able to out-compete and thereby, limit the proliferation of the spoilage organisms. Those organisms which were considered most beneficial in the past have been selected primarily on the basis that they were homofermentative lactic acid producers. The rationale for this approach is that the low pH caused by the lactic acid produced by these organisms would inhibit the growth of spoilage organisms. Strains from species of the genera Lactobacillus, Streptococcus, and Pedicoccus are among those considered to be most beneficial in achieving this type of inhibitory effect.

Lactic acid bacteria have often been used in the preservation of food products utilizing fermentation processes. For example, Jeffreys, U.S. Pat. 3,677,897, discloses a method of culturing and preserving lactic acid bacteria for use as starter cultures in various fermentation processes. The patentee states that the method of the invention can be used to stabilize any of the lactic acid bacteria, singly or in combination, which are well known in the dairy and fermentation industries. Among those organisms which are mentioned is *Lactobacillus plantarum*. The method comprises coating the organisms with an acetylated monoglyceride and adding a carrier selected from the group consisting of modified cellulose and modified starches as, for example, bran solids.

In Moon (*Journal of Science, Food & Agriculture*, 32: 675 (1981)), the author studied the effect of experimental silage prepared from green bean and potato processing wastes which were inoculated with a strain of *Lactobacillus plantarum*. Since these materials were very high in moisture, it was necessary to add ground peanut hulls to reduce the percentage of moisture prior to inoculation. In producing silage in this manner, the author reports that large numbers of undesirable organisms were only present in the uninoculated control silages and that overall the addition of L. plantarum had a beneficial effect on the fermentation of this silage material.

Woolford et al. (*Grass & Forage Science*, 39: 139 (1984)) describes studies on the effect of different cultures of lactic acid bacteria on silage fermentation. The authors set up experimental silages and evaluated 21 strains of lactic acid bacteria from various genera and species, in terms of meeting certain criteria which the authors believe are indicative of the ability to produce good silage. The authors state that none of these cultures satisfied all of the criteria, but three strains (*Streptococcus durans*, strain 1024; *Lactobacillus acidophilus*, strain 2356; and *Lactobacillus plantarum*, strain 6) had greater potential for producing good farm silage than the other 18 strains tested.

In a study reported by McMahon et al. (*Applied Microbiology*, 30: 103 (1975)), the authors studied the deterioration of high-moisture corn in leaky silos which were filled with either normal high-moisture corn (HMC) or with HMC severely infested with Southern corn leaf blight fungus (Helminthosporium maydis). The authors determined the number of mesophilic bacteria, lactobacilli, coliforms, yeast and molds present on the corn samples as received and periodically during 220 days of storage. The authors state that *Lactobacillus plantarum* was the most frequent bacterial isolate, although it was not as predominant in the normal corn as had been found in a previous study. Indeed, *L. plantarum* was found at greater frequency in the blight infested corn than in the normal corn.

In Dellagio et al. (*Systemic & Applied Microbiology* 5: 534 (1984)), the authors studied the lactic acid bacteria present in high-moisture corn grain for up to 120 days using DNA-ONA hybridization. The authors determined that all of the homofermentative lactobacilli tested were highly related to the type strain of *Lactobacillus plantarum*.

The American Type Culture Collection has publicly available a strain of *Lactobacillus plantarum* (ATCC 14431) which was isolated from grass silage.

However, in spite of extensive research into the isolation and development of various organisms for use as agricultural product inoculants, spoilage of these products has remained an on-going problem.

SUMMARY OF THE INVENTION

In the present invention, agricultural products that are to be preserved as a feed are treated with an effective amount of *Lactobacillus plantarum* ATCC 53187. Unlike most members of this species, *L. plantarum* ATCC 53187 is capable of inhibiting common fungal spoilage organisms that are known to be responsible for the deterioration of agricultural products stored for long periods of time for use as feeds. It is possible that the inhibition of these fungi and molds is caused by the production of a toxin or anti-biotic-like substance which causes a fungistatic or fungicidal effect on these organisms.

Thus, the present invention provides a method of treating agricultural products to enhance their preservation which comprises administering to the agricultural products an effective amount of *Lactobacillus plantarum* ATCC 53187 or mutants thereof.

The invention also provides the Lactobacillus strain and effective mutants thereof.

BRIEF DESCRIPTION OF THE PREFERRED EMBODIMENTS

Spoilage of agricultural products due to deterioration caused by the growth of harmful fungi is a major problem in the agricultural community. In the method according to the invention, agricultural products are treated with an effective amount of *Lactobacillus plantarum* ATCC 53187, or mutants thereof, to enhance preservation of the products and diminish the proliferation of spoilage organisms.

The method of the invention is especially useful in that the organism of the invention is non-pathogenic and thereby will not cause disease in an animal consuming the preserved agricultural product. Unlike many types of preservation which utilize the application of expensive or hazardous chemicals, the method of the invention relies instead upon the enhancement of colonization by desirable organisms through improving their ability to compete with naturally-occurring spoilage organisms. Controlling these harmful organisms is a major consideration, since many of the organisms associated with spoilage of preserved agricultural products are fungi which are known to produce potent mycotoxins. These mycotoxins are known to cause illness and even death in animals consuming feed contaminated with these fungi.

The organism which is effective in enhancing the preservation of agricultural products is *Lactobacillus plantarum* ATCC 53187 or effective mutants thereof. *Lactobacillus plantarum* ATCC 53187 is on deposit at the American Type Culture Collection, Rockville, Maryland and has the ATCC Accession No. 53187. By the term "effective mutants thereof" is intended any and all mutants of *L. plantarum* ATCC 53187 which demonstrate the desired fungal inhibiting properties of the present strain or substantial equivalents thereof. Such mutants are considered to be functionally equivalent to the parental strain. *L. plantarum* ATCC 53187 was isolated from corn silage using techniques well known in the art.

It is well known to those of ordinary skill in the art that spontaneous mutation is a common occurrence in microorganisms and that mutations can also be intentionally produced by a variety of known techniques. For example, mutants can be induced using chemical, radioactive, and recombinant techniques. Chemical mutagens can be divided into four main groups based upon their mode of activity. The four groups and examples of each are set out in Table 1 below.

TABLE 1

| ACTIVITY | EXAMPLES |
| --- | --- |
| Base analogues | 5-bromouracil, 2-aminopurine |
| Deaminating agents | nitrous acid, hydroxylamine |
| Alkylating agents | ethyl ethanesulfonate, nitrosoguanidine |
| Acridine derivatives | Acridine orange, ethidium bromide |

Radiation-induced mutations can be caused by such agents as ultraviolet light and x-rays. The primary mechanism by which mutations may be caused result from excision or post-replication repair by recombination. In addition, mutations can also be produced by recombinant techniques using restriction endonucleases. The utilization of this technique is especially valuable in allowing the deletion or insertion of large DNA fragments. The present invention includes within its scope mutants of *L. plantarum* ATCC 53187 produced utilizing any of the mutagens known to the art.

Regardless of the manner in which the mutations are induced, the critical issue is that the mutants function to preserve the agricultural product as described for the parent strain. In other words, the present invention includes mutations resulting in such minor changes as, for example, minor taxonomic alterations such as the fermentation of certain sugars.

The agricultural products which are effectively preserved by the present invention include all agricultural products in which deterioration due to the activity of spoilage organisms is a potential problem.

Among the agricultural products which can be treated using the present invention are silage, baled hay and high-moisture grain. By the term "silage" is intended animal feeds prepared from agricultural products that can be derived from animal or vegetable matter or mixtures thereof. The animal matter which is utilized can be derived from fish, poultry, or cattle. Most commonly, silage is derived from the fermentation of vegetable material such as, for example, grasses, legumes, whole-crop cereals, potatoes, or food manufacture wastes. Commonly ensiled grasses are rye grass, timothy, cocksfoot, and fesque. Examples of legumes which can be used to produce silage are alfalfa, peas, clover, lucerne, sainfoin, field bean, common vetch, and lupin. Whole-crop cereals which can be ensiled include corn, sorghum, barley, wheat, oats, and rye. It is also possible to produce silage using waste material derived from food manufacturing processes such as, for example, those derived from sugar cane, sugar beets, peas, or fruit.

By the term "hay+ is intended all forms of hay as the term is commonly used in agriculture. Hay is most commonly composed of alfalfa, or mixtures of alfalfa and grass.

By the term "high-moisture grain" is intended corn in the form of whole shelled corn, or ground or rolled shelled corn.

In the present invention, the inhibition of fungi responsible for spoilage of agricultural products such as silage, hay, and high-moisture grain, is accomplished by treating the agricultural material with *L. plantarum* ATCC 53187 or compositions containing this organism, as well as treatment with effective mutants of *L. plantarum* ATCC 53187 and compositions containing same.

The compositions which are used in the method of the invention may be in either liquid or dry form and may contain additional bacterial strains. In solid treatment forms, the composition may comprise the organism of the invention together with a carrier. The carrier may be in the nature of an aqueous or nonaqueous liquid or a solid. In solid forms, the composition may contain such diluents as calcium carbonate, starch, or cellulose. The solid composition can be applied directly to the agricultural product or can be first dispersed in a liquid suspension and sprayed thereon.

Typical compositions useful for treating products according to this invention contain $10^2$–$10^{12}$ viable organisms/gm, preferably $10^4$–$10^{10}$ viable organisms/gm, and more preferably $10^6$–$10^8$ viable organisms/gm.

The treatment range for an agricultural product is typically $10^5$–$10^{15}$ viable organisms/ton, preferably $10^7$–$10^{13}$ viable organisms/ton, and more preferably $10^9$–$10^{11}$ viable organisms/ton.

The compositions of the present invention can include, in addition to *Lactobacillus plantarum* ATCC 53187 or mutants of this organism, such other common farm product preservation organisms as, for example, *Streptococcus* spp. or *Pediococcus* spp.

Those or ordinary skill in the art will know of other suitable carriers and dosage forms, or will be able to ascertain such, using routine experimentation. Further, the administration of the various compositions can be carried out using standard techniques common to those of ordinary skill in the art.

The above disclosure generally describes the present invention. A more complete understanding can be obtained by reference to the following specific examples which are provided herein for purposes of illustration only and are not intended to be limiting unless otherwise specified.

EXAMPLE 1

*Lactobacillus plantarum* (ATCC 53187) is a gram-positive rod which was isolated from corn silage. The fermentation profile of this organisms is shown in Table 2. This profile was performed using a commercially available test system (CHL kit, DMS Laboratories, Darts Mill, Flemington, New Jersey).

TABLE 2

| SUBSTRATE | REACTION | SUBSTRATE | REACTION |
|---|---|---|---|
| Glycerol | − | Salicin | + |
| Erythritol | − | Cellobiose | + |
| D-Arabinose | − | Maltose | + |
| L-Arabinose | + | Lactose | + |
| Ribose | + | Melibiose | + |
| D-Xylose | − | Saccharose | + |
| L-Xylose | − | Trehalose | + |
| Adonitol | − | Inuline | − |
| B-Methyl-xyloside | − | Melezitose | + |
| Galactose | + | D-Raffinose | + |
| D-Glucose | + | Starch | − |
| D-Fructose | + | Glycogen | − |
| D-Mannose | + | Xylitol | − |
| L-Sorbose | − | beta-Gentiobiose | + |
| Rhamnose | − | D-Turanose | − |
| Dulcitol | − | D-Lyxose | − |
| Inositol | − | D-Tagatose | − |
| Mannitol | + | D-Fucose | − |
| Sorbitol | + | L-Fucose | − |
| alpha-Methyl D-mannoside | − | D-Arabitol | − |
| alpha-Methyl D-glucoside | − | L-Arabitol | − |
| N—Acetyl-glucosamine | + | Gluconate | + |
| Amygdalin | + | 2-Keto-gluconate | − |
| Arbutin | + | 5-Keto-gluconate | − |
| Esculin | + | | |

Strain ATCC 53187 was grown in MRS broth (DIFCO) supplemented with DL-threonine (Chassy et al., *Journal of Bacteriology*, 127: 1576, 1976) and the plasmid profile determined as described by Anderson et al., *Applied & Environmental Microbiology*, 46: 549 (1983). The size of the plasmids was established using horizontal electrophoresis in agarose (0.6%) with a TRIS-borate buffer (Myers et al., *Journal of Bacteriology*, 127: 1529 (1976)). ATCC 53187 was found to have plasmids of 3.5 and 35.0 megadaltons.

EXAMPLE 2

The ability of *L. plantarum* ATCC 53187 to inhibit fungi known to cause spoilage in agricultural products was compared to that of 18 other strains of *L. plantarum*. These strains were isolated from vegetable material that can be used to produce preserved agricultural feedstuffs. The indicator mold used in the experiment was isolated from spoiled high-moisture corn and was identified as being from the genus Mucor. All isolation techniques used are common to those of skill in the art.

In order to measure the anti-mycotic activity of a given strain of *L. plantarum*, the organism was aseptically streaked down the center of an MRS agar plate (MRS broth (DIFCO) with 0.15% Bacto agar (DIFCO)), after anaerobic incubation at 37° C. for 48 hours to allow growth of the *Lactobacillus*. The fungal indicator organism was inoculated into 5 ml of sterile, melted (48° C.) Potato Dextrose Agar (DIFCO) which was poured onto the surface of the MRS agar plate. The overlay agar containing the fungal indicator organism was allowed to solidify at room temperature for 5-10 minutes. The plates were then incubated aerobically at 37° C. and examined for zones of inhibition on days 4 and 7. The results of this testing are shown in Table 3.

TABLE 3
Mold Inhibition
By Various Strains of *L. plantarum*

| Strain | Source | Inhibition[a] Day 4 | Day 7 |
| --- | --- | --- | --- |
| ATCC 53187 | corn | 27 | 22 |
| S80 | feces | 0 | 0 |
| C54 | corn | 0 | 0 |
| alpha 5 | alfalfa | 0 | 0 |
| C55 | corn | 24 | 21 |
| 345 | alfalfa | 0 | 0 |
| 346 | alfalfa | 8 | 0 |
| 347 | alfalfa | 0 | 0 |
| 287 | corn | 0 | 0 |
| SC13A | corn | 5 | 0 |
| SC18A | corn | 0 | 0 |
| 639A | grass | 10 | 0 |
| 640A | grass | 3 | 0 |
| 15B | alfalfa | 10 | 0 |
| 57B | unknown | 3 | 0 |
| SC30B | corn | 0 | 0 |
| 84B | corn | 0 | 0 |
| 121B | corn | 0 | 0 |
| 97A | artichoke | 0 | 0 |

[a] mm

Although several strains of *L. plantarum* displayed early transient inhibition on Day 4, only one strain (C55) other than strain ATCC 53187 displayed persistent anti-mycotic activity as indicated by the zones of fungal growth inhibition on Day 7. The results of this testing show that the ability of a given strain of *L. plantarum* to show anti-mycotic activity cannot be predicted.

The invention now being fully described, it will be apparent to one of ordinary skill in the art that many changes and modifications can be made thereto without departing from the spirit or scope of the invention as set forth herein.

What is claimed as new and is desired to be covered by Letters Patent is:

1. A method of preserving an agricultural product which comprises treating said product with an effective amount of *Lactobacillus plantarum* ATCC 53187 or effective mutants thereof.

2. The method of claim 1, wherein said agricultural product is selected from silage, baled hay, and high-moisture grain.

3. The method of claim 2, wherein said silage comprises at least one of animal or vegetable matter.

4. The method of claim 3, wherein said animal matter comprises at least one of fish, poultry, or beef.

5. The method of claim 3, wherein said vegetable matter comprises at least one of grass, legume, whole crop cereal, potato, or food manufacture waste.

6. The method of claim 5, wherein said grass is selected from rye grass, timothy, cocksfoot, or fescue.

7. The method of claim 5, wherein said legume is selected from alfalfa, pea, clover, lucerne, sainfoin, field bean, common vetch, or lupin.

8. The method of claim 5, wherein said whole-crop cereal is selected from corn, sorghum, barley, wheat, oats, or rye.

9. The method of claim 5, wherein said food manufacture waste is selected from sugar cane, sugar beets, peas, or fruit waste.

10. The method of claim 2, wherein said high-moisture grain is selected from corn, sorghum, barley, wheat, oats, or rye.

11. The method of claim 1, wherein said treating comprises applying said *Lactobacillus plantarum* ATCC 53187 or mutants thereof to said agricultural products by mixing or spraying.

12. The method of claim 11, wherein said mixing or spraying uses a bacterial composition comprising *Lactobacillus plantarum* ATCC 53187 or effective mutants thereof.

13. The method of claim 12, wherein said bacterial composition is in a liquid or dried form.

14. The method of claim 12, wherein said composition comprises additional bacterial strains.

15. A method of suppressing the growth of fungi in an agricultural product which comprises treating said product with an effective amount of *Lactobacillus plantarum* ATCC 53187 or effective mutants thereof.

16. A biologically pure culture of an organism selected from the group consisting of:
   (a) *Lactobacillus plantarum* ATCC 53187 which possesses a fungal inhibiting property, and
   (b) a mutant derivative of *Lactobacillus plantarum* ATCC 53187 which possesses a fungal inhibiting property that is equivalent to said fungal inhibiting property of *Lactobacillus plantarum* ATCC 53187;
wherein said culture is capable of use in enhancing the preservation of an agricultural product.

17. A composition of matter comprising the biologically pure culture of claim 16 and a carrier.

* * * * *